United States Patent
Guillemot et al.

(10) Patent No.: US 7,539,213 B2
(45) Date of Patent: May 26, 2009

(54) METHOD AND DEVICE FOR VIDEO DATA TRANSMISSION FOR IMPLEMENTING SPECIAL MODES

(75) Inventors: Jean-Charles Guillemot, Thorigne Fouillard (FR); Claude Chapel, Rennes (FR); Olivier Marlec, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 554 days.

(21) Appl. No.: 10/521,384

(22) PCT Filed: Jul. 11, 2003

(86) PCT No.: PCT/EP03/50305

§ 371 (c)(1),
(2), (4) Date: Oct. 4, 2005

(87) PCT Pub. No.: WO2004/008748

PCT Pub. Date: Jan. 22, 2004

(65) Prior Publication Data

US 2006/0104310 A1 May 18, 2006

(30) Foreign Application Priority Data

Jul. 17, 2002 (FR) .................................. 02 09038

(51) Int. Cl.
*H04L 12/28* (2006.01)
(52) U.S. Cl. .................... 370/473; 725/88; 370/486
(58) Field of Classification Search ................ 370/473, 370/486; 725/88; 386/68, 71, 111, 6, 7
See application file for complete search history.

(56) References Cited

U.S. PATENT DOCUMENTS

| | | | | | |
|---|---|---|---|---|---|
| 5,864,682 | A | * | 1/1999 | Porter et al. | 709/247 |
| 6,065,050 | A | * | 5/2000 | DeMoney | 709/219 |
| 6,230,172 | B1 | * | 5/2001 | Purnaveja et al. | 715/205 |
| 6,578,070 | B1 | * | 6/2003 | Weaver et al. | 709/206 |
| 6,931,071 | B2 | * | 8/2005 | Haddad et al. | 375/240.28 |
| 7,027,713 | B1 | * | 4/2006 | Hallberg | 386/68 |
| 7,050,460 | B1 | * | 5/2006 | Eckart et al. | 370/473 |
| 7,376,151 | B2 | * | 5/2008 | Saeijis et al. | 370/473 |
| 2004/0001591 | A1 | * | 1/2004 | Mani et al. | 380/210 |

FOREIGN PATENT DOCUMENTS

| | | |
|---|---|---|
| EP | 0749244 | 12/1996 |
| EP | 1006729 | 6/2000 |
| FR | 2811846 | 1/2002 |

OTHER PUBLICATIONS

Search Report Dated Dec. 10, 2003.

* cited by examiner

*Primary Examiner*—Min Jung
(74) *Attorney, Agent, or Firm*—Robert D. Shedd; Paul P. Kiel

(57) ABSTRACT

The invention concerns a method comprising a step which consists in comparing a label to a value counted from a transfer clock to define the transfer time on the bus of a packet read on a recording medium. The invention is characterized in that for implementing a special mode or trick mode, it further comprises the following steps: calculating a difference between two consecutive packets based on the values of recorded labels; calculating an offset value based on said difference and parameters received on the bus defining the special mode; adding said offset value to the label value of the transmitted packet to obtain a new label value defining the transfer time on the bus of the following packet to be transmitted. The invention is applicable to the storage of MPEG data.

11 Claims, 2 Drawing Sheets

METHOD AND DEVICE FOR VIDEO DATA TRANSMISSION FOR IMPLEMENTING SPECIAL MODES

This application claims the benefit, under 35 U.S.C. § 365 of International Application PCT/EP03/50305, filed Jul. 11, 2003, which was published in accordance with PCT Article 21(2) on Jan. 22, 2004 in French and which claims the benefit of French patent application No. 0209038, filed Jul. 17, 2002.

The invention relates to a method and device for transmitting stored data, encoded according to the MPEG 2 standard or according to the DV standard (acronyms respectively standing for Motion Picture Expert Group and Digital Video). It typically concerns DSS (Digital Satellite System) data originating from a satellite receiver, DV data originating from a digital camcorder etc., with this data passing over an IEEE 1394 bus for storage or reading by a digital decoder.

BACKGROUND OF THE INVENTION

The emergence of new digital audiovisual equipment such as video cassette recorders, camcorders, multimedia computers, and so on, means that it is now essential to use a high speed link between these items of equipment. Home automation networks are built around an IEEE 1394 high speed serial bus to which this equipment subscribes. The audio and video stream data which has to be transmitted in real time is transferred in isochronous mode.

The international standard ISO/IEC 13818-1 relating to the encoding of MPEG 2 type audio and video data, with regard to the systems, describes a synchronization model for the entire chain, in other words for the encoding, transmission, decoding and display of the MPEG type pictures. The recovery of the system clock, on the decoder, is performed, for example, by locking, using a phase-locked loop, the local clock values on the reference clock values transported by the PCR of an incoming TS stream. The time of arrival of the PCR field must not cause any system clock drift as reproduced in the decoder, of more than 30 ppm, the precision imposed by the international standard ISO/IEC 13818-1.

An audiovisual layer has been defined to enable the receiver to offset the transmission time variations introduced by the 1394 bus. It is specified by the standard IEC 61883. A 12-byte header, in the case of the MPEG 2 data, containing a "time stamp", is added to the data packets, the packets being made up of 188 bytes in the case of this MPEG 2 standard.

Before transmission over the bus, at the 1394 interface input, the packets are stamped, using the clock of the 1394 circuits, the precision of which, according to the standard, is 100 ppm. The audio-video packets are stored in the FIFO memory of the 1394 interface, and each packet receives a time sample, in fact a header, when it arrives in the memory. This memory acquires a certain number of packets during the 125 microsecond period, dependent on the input bit rate. When the 125 microsecond synchronization signal ("cycle start") is triggered, these packets are transmitted over the 1394 bus, one after the other in burst mode.

After receipt of the packets from the bus, at the 1394 interface output, the stamp is read and compared with the content of a local counter to define the time at which the packet will be presented. This time sample is used to recreate the time distribution that applied at the FIFO input. The local counter is synchronized at each cycle start on the clock of the root node which generates the 125 microsecond reference period.

In the case of a direct link, in other words of a simple transfer via the 1394 bus, the difference between the time of stamping and the time of reading the tag is around a hundred microseconds. The writing, or more specifically, the tagging, of the data and the reading of this tag are performed on the basis of different local clocks which are, however, simultaneously synchronized every 125 microseconds on the master clock of the root node. Since writing and reading are virtually instantaneous, the effects due to the jitter or drift intrinsic to the synchronization mechanism of the IEEE 1394 bus and the precision of its clock system are not therefore translated into a drift in the time distribution of the packets at the output of the 1394 interface. Consequently, the 1394 bus does not alter the bit rate and this time-stamping according to the IEC 61883 standard solves the problem of loss of the time distribution of the MPEG 2 packets on transmission over the 1394 bus.

However, when a mass storage facility is associated with the audiovisual equipment, when the TS stream transmission chain is "cut", typically because of the storage of the compressed data of this stream on a hard disk for subsequent reading, this specific problem of drift remains when the data passes over the 1394 bus.

The use of tagging in relation to the 1883 layer, for storage on the medium, does not solve the problem because of the precision of the 1394 synchronization clock, which is approximately 100 ppm. The time at which the data is stamped is different from the time at which the data is read from the hard disk. There is drift on the output bit rate of the 1394 interface because of the new time distribution of the packets associated with the change of clock frequency.

It can also be seen that the root node at the time of storage can be different from that at the time of reading. Consequently, at the time of tagging the clock can be synchronized on a master clock that is different from that used on reading the tag.

This drift on the bit rate and therefore on the times of arrival of the PCRs on which the local 27 MHz clock is synchronized, causes a frequency drift on that clock. Consequently, in the more or less long term, an underflow or overflow of the buffer of the MPEG decoder occurs, being reflected in a picture display fault on the receiver, typically a freezing of the picture at recurrent intervals.

Too great an offset of this synchronized clock can also impair the quality of the chrominance signals extracted from the subcarrier.

Modifying the precision of 100 ppm of a particular item of equipment would not solve the problem because any equipment can be declared the root node on writing and then on reading the data on the hard disk.

A known mode of operation, called "pull", in which the data transfer rate from the hard disk to the decoder can be "controlled" by the decoder, typically according to the fill rate of the buffer of the decoder, can be used to avoid any underflow or overflow of this buffer. In this mode, the problems of clock precision are less crucial, since too great a drift of the decoder clock, caused by a drift in the bit rate, is corrected by regulation of the read mode stream bit rate, by the decoder, according to the fill rate of the buffer of the decoder. This mode of operation is not, however, possible in the case of TS stream storage which does not allow direct memory access (DMA) by the decoder. As for storage at the PES packet level, it does not allow this data to be transferred over the 1394 bus.

Thus, if the compressed data is not transmitted directly to a decoder but is stored on a storage medium, typically a hard disk, so that it can subsequently be read via a 1394 bus, problems of drift remain, causing a picture display fault at recurrent and more or less brief intervals.

The patent application filed in France on Jul. 17, 2000 and published under the number 2 811 846 solves this problem.

The method of reading, from a storage medium, audio and video data encoded in packet form according to the MPEG standard, so that it can be transmitted to a decoder via a 1394 bus, which comprises a step for reading tags stored with the packets, these tags defining the times of arrival of the data packets to be stored, based on a tagging clock, and a step for comparing the tags with values counted on the basis of a transfer clock to define the times of transfer over the bus of the data read from the storage medium.

The operating frequencies of said tagging and transfer clocks must satisfy certain specifications, in particular with respect to the maximum difference between these frequencies or the drift if it is one and the same clock.

By time stamping the packets stored in the storage medium on the basis of a specific clock, the risks of underflow or overflow of the buffer of the decoder are minimized. There is then perfect compatibility for the storage and transfer of DV or MPEG type signals over a 1394 bus.

A particular problem occurs in the use of the trick modes described in the MPEG standard. The time-stamping of the packets and the creation of files containing the tags entail modifying the latter when using these trick modes. In practice, while this use does not pose problems locally, in other words when the decoder is the master, the same does not apply when operating a server, which, in normal mode, returns the data at the same rate as on storage. For example, when operating the fast forward mode, the server must increase the bit rate on transmission. Since it has the only file on disk containing the tags, one solution is to modify these tags stored in the files. The application makes this modification in real time. This solution is very bandwidth and central processing unit resource intensive. A modification of the tags not in real time, with rewriting of the modified tags on the medium, cannot be envisaged because it is too processing time intensive and does not allow for a response in virtually real time to the trick mode commands, which are by definition unpredictable.

Another solution is to have a large storage capacity locally, typically on the decoder, to perform simple trick mode functions, but this solution is video memory intensive.

SUMMARY OF THE INVENTION

The invention proposed here, which is a refinement of the method and device that are the objects of the published patent application referred to above, solves the aforementioned problems.

To this end, the object of the invention is a method of transmitting, over a bus, encoded video data stored on a storage medium, the stored data being data packets and tags assigned to the packets, comprising a step for comparing a tag with a value counted from a transfer clock to define the time of transfer over the bus of a packet read from the storage medium, characterized in that, for the implementation of a trick mode, it also comprises the following steps:
  computation of the difference between two consecutive packets according to stored tag values,
  computation of an offset value according to this difference and parameters received over the bus defining the trick mode,
  addition of this offset to the tag value of the packet transmitted to obtain a new tag value defining the time of transfer over the bus of the next packet to be transmitted.

According to a particular embodiment, the difference is averaged over a succession of packets. The computation of the average difference can be performed not in real time, based on stored tags taken over a predefined period.

The invention also relates to a data transmission device for implementing the above method, characterized in that it comprises:
  a counter for supplying counting information,
  a comparator which compares the count information with a tag to trigger the transmission of the packet corresponding to the tag, over the bus,
  a computation circuit receiving the parameters of the trick mode and the tag values of preceding packets transmitted to compute an offset value according to these parameters and the difference between the tag values of two successive packets,
  an adder for adding the tag value corresponding to the time of transmission of a packet (n−1) to an offset value to define a new tag value transmitted to the comparator and corresponding to the transmission of a subsequent packet n.

The invention also relates to a server using such a transmission device.

The idea is, not that the application modifies the tags stored on the hard disk, in real time, but that it computes an offset to apply it to the tags read which are compared with counted values to decide the time of transmission of the packets. The solution therefore consists in involving the server, the offsets being computed according to the parameters of the selected trick mode transmitted by the decoder.

The invention provides a simple means of operating trick modes such as fast forward and slow motion, etc, without requiring major storage or CPU processing resources. It can be used to replay pre-stored streams at variable speeds, while retaining a given bit rate imposed by the tags stored on the storage medium with the data packets and guaranteeing the rereading rate. The trick modes can be implemented through a domestic network, based on a single source file, with no index file.

BRIEF DESCRIPTION OF THE DRAWINGS

Other particular features and advantages of the invention will become clearly apparent from the following description given by way of non-limiting example and referring to the appended figures which represent.

DESCRIPTION OF PREFERRED EMBODIMENTS

Figure 1:
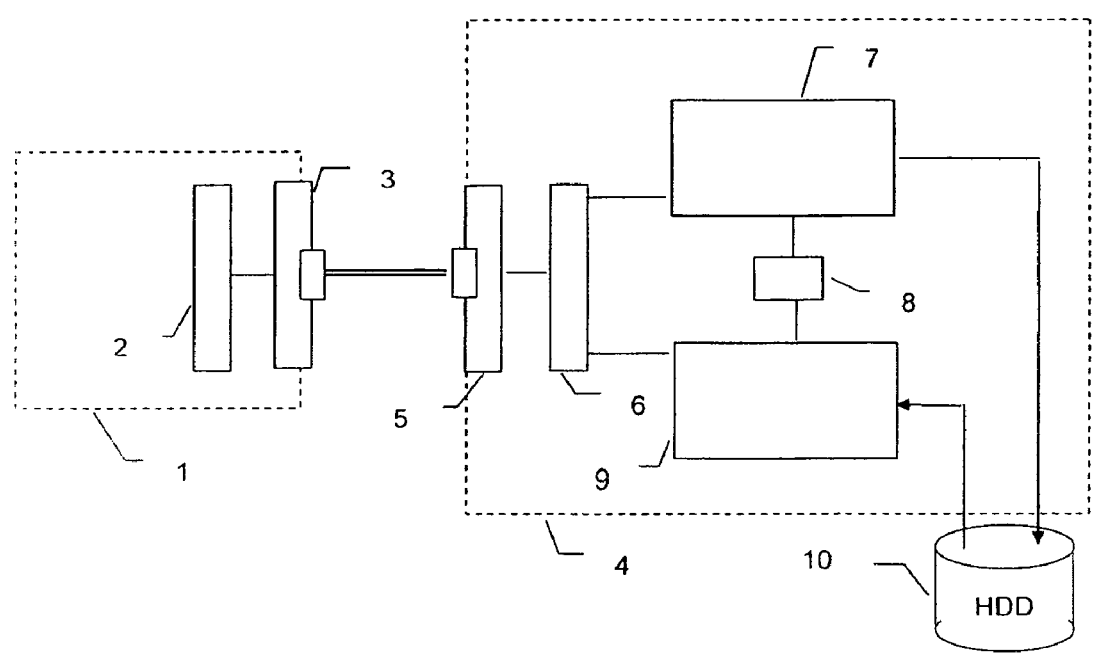
FIG. 1, a receiver linked to a storage device,
  FIG. 2, a read interface circuit.

An example of a device to which the invention applies, described in published patent application No. 2 811 846, is reviewed below. It is represented in FIG. 1. It concerns a device for storing compressed data on a hard disk, linked to a satellite receiver, and for reading this data via a 1394 bus.

A receiver 1 equipped with a 1394 interface circuit receives an audio-video data stream compressed according to the MPEG 2 standard originating from a satellite transmission, called a transport stream TS in the standard. The signal received by the receiver is, among other things, demodulated to supply a baseband signal. This transport stream comprises a number of programmes. It can be transmitted unchanged or after filtering to select only the packets corresponding to a chosen programme.

A 1394 interface circuit incorporated in the receiver is used to transmit this data stream over the 1394 link. This circuit comprises, according to the designations in the standard, a "link control" layer (LINK) 2 and a physical interface layer (PHY) 3. It can be used, among other things, to tag the packets according to the IEC 61883 standard. The data is transmitted via a 1394 port. The storage device 4 comprises a hard disk 10 and a hard disk interface circuit 4 linked to the 1394 bus and to the hard disk.

This interface circuit 4 comprises a PHY circuit 5, a LINK circuit 6, a write interface circuit 7, a read interface circuit 9 and a clock circuit 8.

The data arrives, via a 1394 port, over a PHY circuit 5 and a LINK circuit 6 compliant with the 1394 standard. It is transmitted to the output audio-video port of the LINK circuit at times corresponding to the tagging of the packets. The audio-video port is linked to the input of a write interface circuit 7 which time-stamps the data. The hard disk interface circuit 4 is linked to a hard disk 10. It transmits the time-stamped data to the hard disk for storage.

The hard disk 10 is linked to an input of the interface circuit 4 for reading the data. A read interface circuit 9 reads the data at this input to transmit it to the input audio-video port of the PHY circuit 6. This data is then sent to the 1394 bus via the PHY circuit 5 and the 1394 port.

A clock 8 feeds each of the interface circuits 7 and 9.

Figure 2:
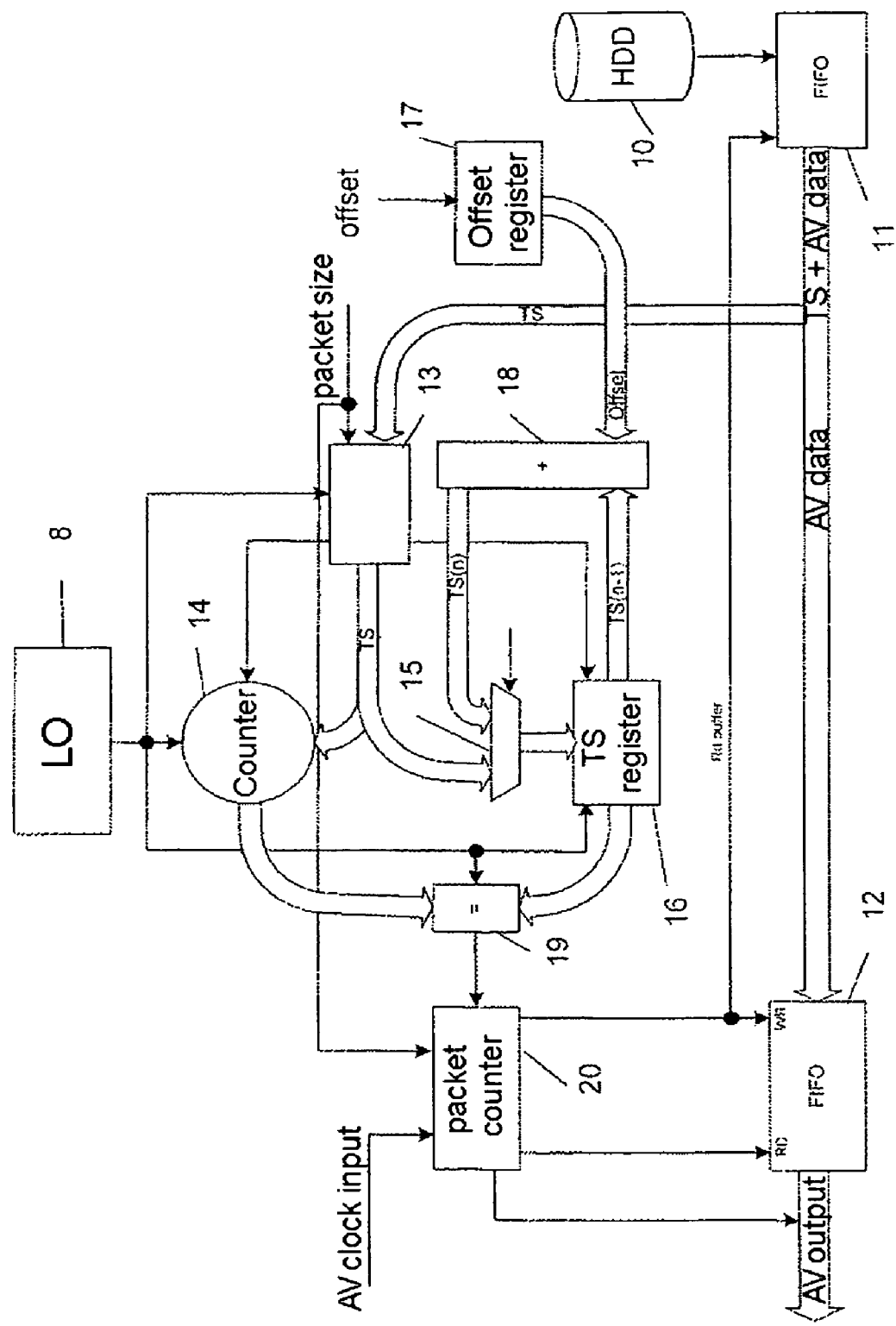

The invention that is the object of this patent application relates more specifically to the interface circuit 9. FIG. 2 represents such a circuit which again includes the items already described in the abovementioned published patent application, and the operation of which is described below.

The hard disk 10 is linked to an input of the read interface circuit 9 to supply the stored data. This data at the input of this circuit passes through a read buffer memory 11 to be transmitted to a packet memory 12 and a tag extraction circuit 13. The audio-video data is stored in the packet memory 12 while the tagging data is extracted then stored by the tag extraction circuit 13. This tagging data is the data added to the audio-video data by the circuit 7, for each packet. The information concerning the length of a packet is transmitted to the extraction circuit 13, with the tag to be extracted being received at the packet rate.

The extraction circuit 13 transmits the tags to the input of a restoration counter 14 and to a first input of a switch 15, in synchronism with the clock 8 received by the interface circuit. It also transmits a load command signal to the restoration counter on opening the file, the counter then loading the first time tag read on opening the file in order to initialize itself.

The output of the switch 15 is linked to a time tag storage register 16. The extraction circuit 13 transmits a signal acknowledging the data to the register 16, on transmission of an extracted time tag. The information at the output of the switch is then loaded by the register in synchronism with the clock signal 8 also received by this register.

A tag offset register 17 receives offset information computed by the central processing unit (CPU), not shown in the figure. This computation is performed on the basis of the commands received from the decoder. The offset data is transmitted to the input of an adder circuit 18. A second input of the adder circuit receives the information from the register 16. The output of the adder is transmitted to the second input of the switch 15.

The clock input of the counter 14 receives the clock 8 signals. The output of the counter 14 is transmitted to a comparator 19 which receives on a second input the data output from the register 16, either the time tag of the packet which is currently being stored in the packet memory 12, or the tag of the preceding packet to which has been added the offset. When a match is detected matching, and synchronized on the clock 8 signal received by the circuit, a read control signal is transmitted by this comparator 19 to a packet counter 20. On receiving this signal, the counter 20 triggers the reading, from the packet memory 12, of a number of bytes corresponding to one packet. This packet counter receives the information concerning the length of a packet. While the data is being read from the packet memory 12, the counter 20 initiates the reading of a new packet from the read buffer memory 11 and the writing of this packet into the packet memory 12. The clock input of the packet counter is fed by the audio-video clock signal originating from the LINK interface 6 to synchronize the transmission of the data. The audio-video data originating from the packet memory 12, as well as the packet start clock signals and corresponding valid data originating from the packet counter 20 are supplied at the output of the interface circuit 9.

Thus, the restoration counter 14 is initialized with the tag of the first packet read from the file on the hard disk. In the transitional phase, the first packet is stored in the packet memory and read immediately, therefore immediately transmitted to the audio-video input port of the LINK circuit 6. After storage followed by the immediate transmission of the first packet, the tag of the second packet is extracted and its value or that of the preceding packet to which has been added an offset value, is loaded in the register 16 while the second packet is stored in the packet memory. The counter 14 runs at the frequency of the precision clock 8, and when the count value is equal to the value stored in the register 16, the comparator 19 transmits a packet counter 20 trigger signal for the reading and transmission to the audio-video input port of the LINK circuit 6 of the number of bytes corresponding to one packet. And so on, each time a new packet is read.

The data relating to the trick mode commands is transmitted via the IEEE 1394 bus, in asynchronous mode. This transmission uses proprietary interworking protocols or even standardized interworking protocols such as HAVi (Home Audio Video interface) or UPnP (Universal Plug and Play).

When a trick mode command is received by the central processing unit (CPU) of the server, the latter computes the offset according to the relative difference between two successive packets, typically averaged over ten or so seconds, and the parameters of the selected mode. The averaging, which can be performed continuously, provides a value representative of the average stream bit rate, since the time distribution between two packets can be very different from one packet to another. This offset is stored in the offset register 17 to be transmitted to the adder 18. The latter adds this offset to the tag TS(n−1) of the packet previously transmitted and originating from the TS register 16 to supply a new modified tag value TS(n) for the next packet to be transmitted. This value is transmitted to the switch 15 which supplies it to the TS register 16 for loading in that register, with the switch command originating from the CPU enabling this input, the command responding to the trick mode request transmitted by the decoder. When the output of the counter 14 corresponds to this modified tag, the comparator transmits the information to the packet counter 20 which initiates the transfer of the packet over the bus.

Thus, if the trick mode operating command is received, for example, on sending or after the sending of the packet (n−1) over the network, corresponding to the tag TS(n−1) read from the storage medium, the sending of the next packet (n) will be triggered by the next tag TS(n) computed by adding the offset to the tag TS(n−1).

We have:

$TS(n-1)=TS(\text{file})$ $TS(n)=TS(\text{file})+\text{offset}$ $TS(n+1)=TS(\text{file})+2\times\text{offset}$ $TS(n+2)=TS(\text{file})+3\times\text{offset}$ and so on until the switch to the normal read mode is effective again.

TS(file) corresponds to the tag associated with the packet (n−1) stored on the storage medium.

The computation of the offset can be done not in real time, in other words before transmission of the packets, based on stored tag values. The averaging is performed over a number of tags corresponding to a predefined transmission time. This number typically corresponds to the number of successive tags beyond which the variation in the average value becomes negligible, and this, for a given number of samples, a sample corresponding to a set of successive tags out of the stored tags. This number can even be chosen to correspond to a period of approximately ten seconds or more, the representativeness of the value being directly proportional to the number of tags taken into account.

The computation of the offset by the central processing unit can be performed taking into account the last computed average value relating to the difference between two packets, for operation in normal mode, assuming the latter to be refreshed continually, the operating speed in normal mode and the new speed requested. It is also possible to take account of the last average value computed regardless of the operating mode and the last operating speed applied, from which this average value was computed.

The application computes, from the required trick mode parameters and this average value, the offset to be applied to the tag values. The average value of the difference between the tag values relating to two successive packets is computed. Let a be this value. Operation in fast forward mode, for example at a speed n times greater than the normal scrolling speed of the pictures then corresponds to an offset equal to a/n. The packets are thus transferred into the packet memory 12 and read over the network at a speed n times greater. Similarly, slow-motion operation, for example by a coefficient p, corresponds to an offset of a×p, the packet counter 20 then triggering the writing of the packets into the memory and the transferring of the packets over the network at a speed p times slower than the normal speed.

The buffer memory of the decoder stores the packets received. The arithmetic and logic unit of the decoder extracts the stored pictures from the buffer, at the display frequency. If the trick mode is the fast forward mode, a certain proportion of stored pictures is discarded and the decoder decodes only those pictures that are to be displayed.

Naturally, the user can at any time exit from the trick mode or modify the parameters, for example to return to the normal film playback speed, the request transmitted to the decoder being sent immediately to the server over the 1394 bus, in asynchronous mode, for it to resume transmission of the stream at the initial speed.

The invention described relates to the MPEG standard and transmission over a 1394 bus. However, the invention can be applied to any reading method based on the comparison of tags stored with video data on a storage medium to define the time of data transmission over the bus.

What is claimed is:

1. Method for implementing trick modes when encoded video data stored on a storage medium is being transmitted to a receiver over a bus, the stored encoded video data being data packets and tag values assigned to the data packets and corresponding to time-stamps, the time of transfer over the bus of a data packet read from the storage medium being defined through a comparison of a tag value with a value counted from a transfer clock, a tag value for comparison being the stored tag value as long as a trick mode is not implemented, the method comprising:
   transferring a packet over the bus by using a modified tag value as the tag value for comparison, wherein the modified tag value being determined by:
      computation of a difference between two consecutive packets, according to stored tag values of the two consecutive packets,
      computation of an offset value according to the difference and trick mode parameters received over the bus,
      addition of the offset to a stored tag value of a preceding transmitted packet to output the modified tag value.

2. Method according to claim 1, wherein the difference between two consecutive packets is averaged over a succession of packets.

3. Method according to claim 2, wherein the computation of the average difference is performed not in real time, based on stored tags taken over a predefined period.

4. Method according to claim 2, wherein the stored data corresponds to a transport stream (TS).

5. Method according to claim 1, wherein the stored data is at least audio and video data encoded according to the MPEG standard.

6. Method according to claim 1, wherein the bus is an IEEE 1394 bus.

7. Method according to claim 6, wherein the trick mode parameters originate from a decoder linked to the IEEE 1394 bus.

8. Method according to claim 1, wherein the trick modes comprise at least a slow-motion mode and a fast forward mode, and wherein a parameter of a trick mode being a speed.

9. A device for implementing trick modes when encoded video data stored on a storage medium is being transmitted to a receiver over a bus, comprising:
   a transfer clock for supplying counted values,
   a comparator which compares the counted values with a tag value to trigger the transmission of a packet corresponding to the tag, over the bus,
   a computation circuit receiving trick mode parameters and tag values of preceding transmitted packets, to compute an offset value according to the trick mode parameters and to a difference between the tag values of two successive packets,
   an adder for adding the tag value corresponding to the time of transmission of a preceding transmitted packet (n−1) to the offset value to define a modified tag value transmitted to the comparator, which is the tag value for triggering the transmission of a subsequent packet (n) during a trick mode.

10. Device according to claim 9, wherein the computation circuit computes an average value of the differences between the tag values of two successive packets.

11. Server, comprising a device according to claim 9.

* * * * *